US009309848B2

(12) United States Patent
Prociw et al.

(10) Patent No.: US 9,309,848 B2
(45) Date of Patent: Apr. 12, 2016

(54) CARBON CONTAMINATION RESISTANT PRESSURE ATOMIZING NOZZLES

(71) Applicant: Delavan Inc., West Des Moines, IA (US)

(72) Inventors: Lev A. Prociw, Johnston, IA (US); Kevin E. Thompson, West Des Moines, IA (US); Steve J. Myers, Norwalk, IA (US)

(73) Assignee: Delavan Inc., West Des Moines, IA (US)

( * ) Notice: Subject to any disclaimer, the term of this patent is extended or adjusted under 35 U.S.C. 154(b) by 0 days.

(21) Appl. No.: 14/512,305

(22) Filed: Oct. 10, 2014

(65) Prior Publication Data

US 2015/0159608 A1 Jun. 11, 2015

Related U.S. Application Data

(62) Division of application No. 13/247,199, filed on Sep. 28, 2011, now Pat. No. 8,881,995.

(60) Provisional application No. 61/387,746, filed on Sep. 29, 2010.

(51) Int. Cl.

| | |
|---|---|
| ***B05B 1/24*** | (2006.01) |
| ***F02M 53/08*** | (2006.01) |
| ***F01N 3/36*** | (2006.01) |
| *F01N 3/025* | (2006.01) |

(52) U.S. Cl.

CPC ................. *F02M 53/08* (2013.01); *F01N 3/36* (2013.01); *F01N 3/0253* (2013.01); *F01N 2610/03* (2013.01); *F01N 2610/11* (2013.01); *F01N 2610/1453* (2013.01); *Y02T 10/20* (2013.01)

(58) Field of Classification Search

CPC .. F02M 25/0731; F02M 53/06; F02M 63/007
USPC ................. 239/128, 132, 132.1, 132.3, 132.5
See application file for complete search history.

(56) References Cited

U.S. PATENT DOCUMENTS

| | | | | |
|---|---|---|---|---|
| 6,234,406 | B1 | 5/2001 | Thomas | |
| 7,997,510 | B2 | 8/2011 | Pavia et al. | |
| 8,056,326 | B2 * | 11/2011 | Cox ...................... | F01N 3/0256 239/128 |
| 8,281,594 | B2 | 10/2012 | Wiebe | |
| 2010/0084489 | A1 * | 4/2010 | Chang ................. | F02M 47/027 239/132 |

* cited by examiner

*Primary Examiner* — Davis Hwu

(74) *Attorney, Agent, or Firm* — Locke Lord LLP; Scott D. Wofsy; Christopher J. Cillié

(57) ABSTRACT

A pressure atomizing nozzle for injecting fuel includes an inlet housing configured to thermally isolate the interior space from external conditions and to remain relatively cool under operation so as to substantially eliminate heat soak back from the inlet housing to the interior space thereof after operation. First and second coolant conduits cool the nozzle tip region actively during operation and passively after operation. A cooling air jacket is configured to thermally isolate inboard components from exterior conditions, to provide clean air during operation to the nozzle tip region for diluting carbon to reduce carbon deposits in the nozzle tip region and for cooling the same, and to provide passive cooling to the nozzle tip region after operation.

5 Claims, 11 Drawing Sheets

CARBON CONTAMINATION RESISTANT PRESSURE ATOMIZING NOZZLES

CROSS-REFERENCE TO RELATED APPLICATIONS

This application is a divisional application of co-pending U.S. patent application Ser. No. 13/247,199 filed Sep. 28, 2011, which claims priority to and the benefits of U.S. Provisional Application Ser. No. 61/387,746, filed Sep. 29, 2010, each of which are incorporated herein by reference in their entireties.

BACKGROUND OF THE INVENTION

1. Field of the Invention

The present invention relates to liquid injection nozzles, and more particularly, to pressure atomizing nozzles for injecting fuel for combustion.

2. Description of Related Art

A variety of devices are known for injecting and atomizing liquids. For example, pressure atomizing nozzles can be used to inject an atomized spray of fuel to be combusted in a furnace, gas turbine engine, or the like. The harsh environment of combusting fuel gives rise to difficulties associated with the breakdown of fuel at high temperatures. Hydrocarbon fuels tend to decompose when heated. At elevated temperatures below about 800° F., dissolved oxygen in the fuel forms coke deposits. At temperatures above about 800° F., pyrolysis occurs leading to carbon deposits. Coke deposits tend to form on internal nozzle surfaces, and carbon deposits tend to form on external nozzle surfaces. Coke and carbon deposits are each described in greater detail below. These problems give rise to a need to replace or clean nozzles operating in combustion environments which results in expense and/or downtime that could otherwise be avoided.

With respect to coke formation, intricate fuel passages of typical atomizing nozzles are susceptible to the formation of coke when heated to sufficient temperatures. This is particularly a problem when stagnant fuel in the fuel passages is heated, such as just after an engine is shut down, or when an engine is running with staged fuel injection so that some fuel passages are stagnant during operation. Coke deposits accumulate in nozzle tip openings and intricate fuel passages and if left unchecked can lead to inadequate flow and even complete blockage of flow.

With respect to carbon deposits, the deposition of carbon on exposed nozzle surfaces, e.g., soot deposits, can occur wherever relatively cool surfaces are exposed to combustion products. When fuel is running through a typical nozzle with combustion occurring just downstream of the nozzle, the nozzle is cooled by the fuel flowing therethrough. Carbon released from the fuel by pyrolysis, coming into contact with the relatively cool exposed surfaces of the nozzle, can condense and form a carbon deposit thereon. Similar to coke deposits, carbon deposits can alter nozzle geometry and therefore hinder proper functioning.

Some solutions to these problems have been practiced with some success. For example, one approach is to use a local thermal heater to systematically burn carbon and coke from the nozzle tip to keep the nozzle free of contamination. However, the heater approach is relatively expensive and introduces its own reliability issues.

Such conventional methods and systems have generally been considered satisfactory for their intended purposes. However, there is still a need in the art for nozzles that allow for improved reduction and/or prevention of carbon and coke deposition, including by passive means. There also remains a need in the art for such nozzles that are easy to make and use. The present invention provides a solution for these problems.

SUMMARY OF THE INVENTION

The subject invention is directed to a new and useful spray nozzle for injecting fuel. The spray nozzle includes an inlet housing having a fuel inlet and first and second coolant ports. The inlet housing defines an interior space and is configured to thermally isolate the interior space from external conditions during operation and to reduce heat soak back from the inlet housing to the interior space thereof after operation. A fuel conduit is mounted in the interior space of the inlet housing in fluid communication with the fuel inlet for providing fuel to a spray nozzle, e.g., a pressure atomizing nozzle, mounted to the fuel conduit.

In certain embodiments, a first coolant conduit is mounted in the interior space of the inlet housing outboard of the fuel conduit and in fluid communication with the first coolant port of the inlet housing and with a nozzle tip region proximate an outlet end of the spray nozzle. It is also contemplated that a second coolant conduit can be mounted in the interior space of the inlet housing outboard of the first coolant conduit and in fluid communication with the second coolant port of the inlet housing and with the nozzle tip region. The first and second coolant conduits are configured and adapted to conduct coolant from one of the coolant ports to the nozzle tip region, and to conduct coolant from the nozzle tip region to the other of the coolant ports for cooling the nozzle tip region actively during operation. The first and second coolant conduits are configured and adapted to conduct coolant passively to cool the nozzle tip region after operation.

For example, the first coolant port can be a coolant outlet, wherein the second coolant port is a coolant inlet. The second coolant conduit can be configured and adapted to conduct coolant from the coolant inlet to the nozzle tip region for cooling the nozzle tip region, and the first coolant conduit can be configured and adapted to conduct coolant away from the nozzle tip region to the coolant outlet. It is also contemplated that a downstream tip region of the first coolant conduit can include coolant metering slots for passage of coolant from the second coolant conduit into the first coolant conduit.

In accordance with certain embodiments, the fuel inlet is a first fuel stage inlet and the inlet housing includes a second fuel stage inlet. A second fuel conduit is mounted in the interior space of the inlet housing outboard of the first fuel conduit, inboard of the second coolant conduit, for example, and in fluid communication with the second fuel stage inlet of the inlet housing for providing fuel to a second spray nozzle mounted outboard of the first spray nozzle.

It is also contemplated that a cooling air jacket can be mounted to the inlet housing outboard of the second coolant conduit for conducting a flow of cooling air to the nozzle tip region, wherein the cooling air jacket is configured to thermally isolate inboard components from exterior conditions, to provide clean air during operation to the nozzle tip region for diluting carbon to reduce carbon deposits on the spray nozzle and for cooling the same, and to conduct air for passive cooling to the nozzle tip region after operation. The inlet housing and/or the cooling air jacket itself can include a cooling air inlet in fluid communication with an air flow circuit within the cooling air jacket for supplying cooling air during operation. A heat shield can be mounted inboard of the cooling air jacket and outboard of a component inboard of the cooling air jacket, for example a second coolant conduit as described above, to provide thermal isolation therebetween.

The cooling air jacket can include an outlet aperture in proximity with the nozzle tip region for providing an outlet for the spray nozzle and cooling air.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
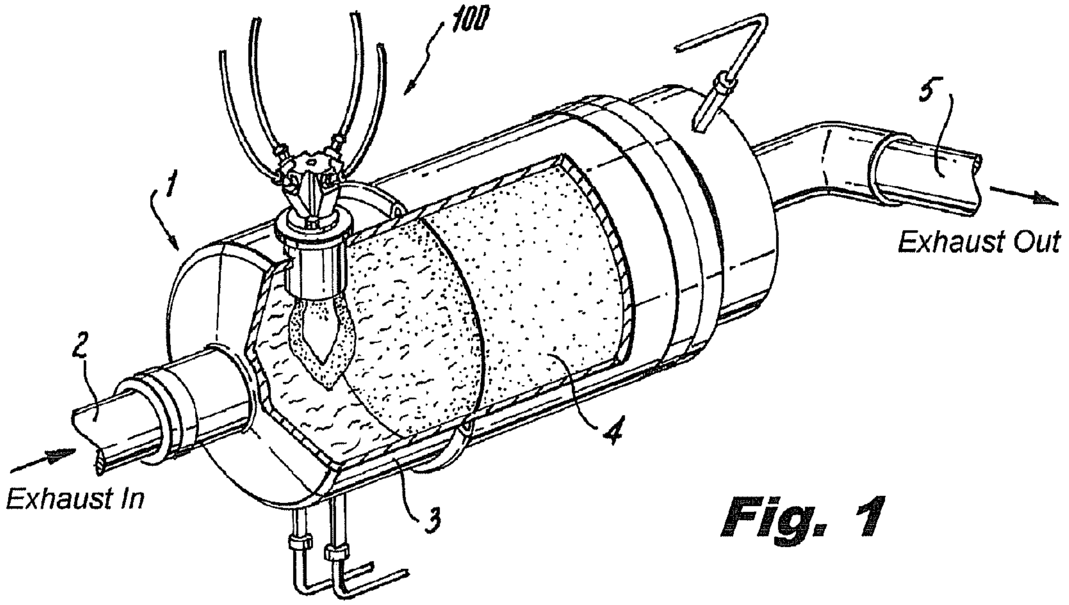
FIG. 1 is a cross-sectional perspective view of an exemplary exhaust treatment system incorporating a nozzle constructed in accordance with the present invention, showing the flow of exhaust through the system.

Reference will now be made to the drawings wherein like reference numerals identify similar structural features or aspects of the subject invention. For purposes of explanation and illustration, and not limitation, a partial view of an exemplary embodiment of a nozzle in accordance with the invention is shown in FIG. 1 and is designated generally by reference character 100. Other embodiments of nozzles in accordance with the invention, or aspects thereof, are provided in FIGS. 2-13, as will be described. The system of the invention can be used to reduce or eliminate coke and/or carbon deposits in nozzles, for example, nozzles used in combustion based heating devices or engines.

Referring to FIG. 1, an exhaust treatment system 1 is shown for treating exhaust entering inlet 2 with unburned components. The untreated exhaust enters housing 3, where it must pass through filter 4. Filter 4 traps particulate matter and thereby cleanses the exhaust. Over time, filter 4 becomes saturated with particulate matter filtered from the exhaust. In order to clear or regenerate filter 4, nozzle 100 can be activated occasionally, burning fuel therefrom as needed to raise the temperature of filter 4. Engine fuel and air are supplied to nozzle 100 to produce combustion heat. The heat combusts trapped particulate matter and clears filter 4 for further use. After being filtered, the exhaust finally exits system 1 through outlet 5. The treated exhaust can then be expelled to the atmosphere having had a significant amount of the harmful pollutants removed by system 1. Exhaust treatment system 1 can be used, for example, to treat diesel exhaust to reduce particulate matter emissions.

Figure 2:
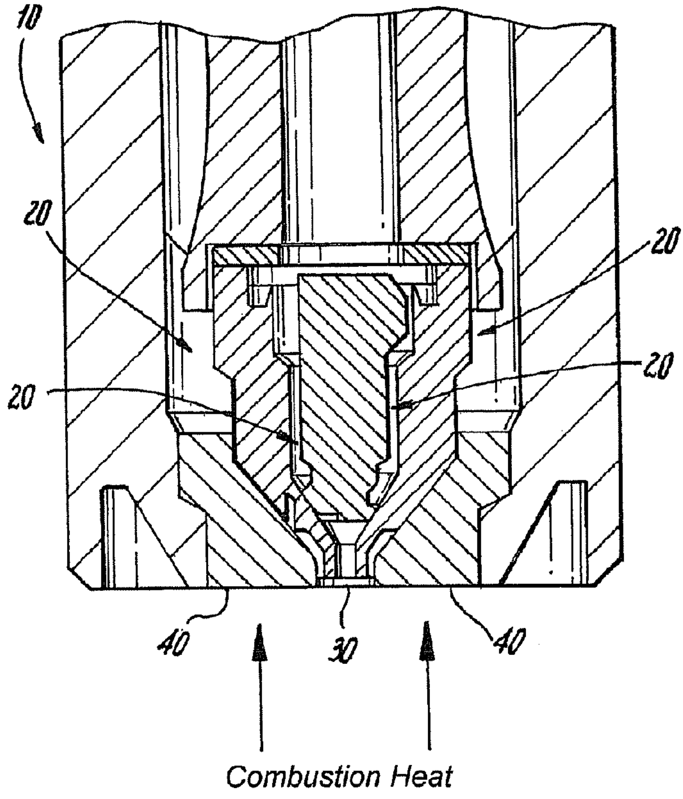
FIG. 2 is a cross-sectional side elevation view of a prior art two-stage pressure atomizing nozzle, showing typical regions where coke and carbon accumulate.

With reference to FIG. 2, the outlet end of a typical prior art duplex pressure atomizing nozzle 10 is shown. In certain applications where such atomizing nozzles are used, such as system 1 described above, nozzle 10 is located in a heated gas stream even when fuel is not flowing through nozzle 10. For example in system 1, if prior art nozzle 10 is used instead of nozzle 100 of the subject application, while in operation in the interim between firings of nozzle 10, high temperature exhaust filters past nozzle 10. When the combustion cycle is over, the hot inlet exhaust persists although at lower temperatures when the nozzle is not firing. Since the inlet exhaust is often above temperature levels known to destabilize hydrocarbon fuels, stagnant fuel in the typical nozzles such as nozzle 10 is prone to coking in passages running through the nozzle 10.

With continued reference to FIG. 2, nozzle 10 is also subject to detrimental coking conditions when nozzle 10 is firing only one of its two fuel circuits. This can be particularly detrimental to the stagnant secondary channels (i.e., fuel passages 20) in the nozzle tip which are not flowing while the primary fuel is still flowing to feed a flame. The heat from the primary flame cokes the stagnant fuel in the secondary channels. Surface tension holds fuel in the secondary flow distributor, e.g., around tip area 40 in FIG. 2 and adjacent fuel passages 20, and exposes this fuel to heat from the metallic surfaces heated by combustion gases as indicated by the large arrows in FIG. 2.

Small nozzle geometry can lead to surface tension causing fuel to not only be present at the nozzle tip, but possibly even continue to leak or drool from nozzle 10 even after nozzle 10 has been turned off. Nozzle shut down can accentuate coking conditions beyond those when the nozzle 10 is operating because the cooling flow of fuel through nozzle 10 is stopped but there is still considerable heat present in and around nozzle 10. And, even when the supply of exhaust is shut off, e.g., when the diesel engine is shut down, the heat accumulated in housing 3 that supports nozzle 10 flows into the cooler fuel passages 20 and into nozzle 10 itself. This is a common phenomenon called heat soak back.

Moreover, when the engine is shut off, hot exhaust ducts cool by natural convection. The resultant high temperature gases seek higher levels and can accumulate around nozzle 10. This can expose stagnant fuel held by surface tension in fuel passages 20 to temperatures in excess of those required to destabilize the fuel and deposit coke. High recirculation of hot external gases can heat the nozzle all the way to the core. If fuel is shut off, but hot external gasses persists, both primary and secondary fuel channels will show signs of contamination unless preventative measures are taken.

The foregoing discussion has described various causes for coke deposits in nozzles, and the following discussion describes causes for carbon deposits. Engine running conditions are usually responsible for carbon deposits in areas with an excessive, hot fuel concentration and a shortage of air. These conditions typically occur external to, but in close proximity to the nozzle. External carbon, as opposed to internal coke, can accumulate near fuel nozzle orifice 30 from combustion gases being entrained by the high pressure fuel spray and condensing around the fuel opening. Carbon deposited on the face of nozzles is common for many pressure atomizing fuel nozzles, and it can detrimentally affect nozzle spray and flow number. Excessive combustion swirl, hot recirculation after fuel flow is shut off, and/or hot convection flow due to buoyancy can result in carbon deposits that affect the spray cone from the tip of the primary nozzle, i.e., the nozzle on the centerline. Flow number will be reduced by carbon deposited on this contaminated flare.

In short, heat sources that can be problematic for nozzles include soak back from adjacent housings or castings, recirculating combustion gas flows too close to the nozzle face, and hot gases from downstream exhaust components that flow towards nozzles driven by buoyancy after shut down. These heat sources tend to cause accumulation of deleterious coke and carbon deposits in nozzle components.

Figure 3:
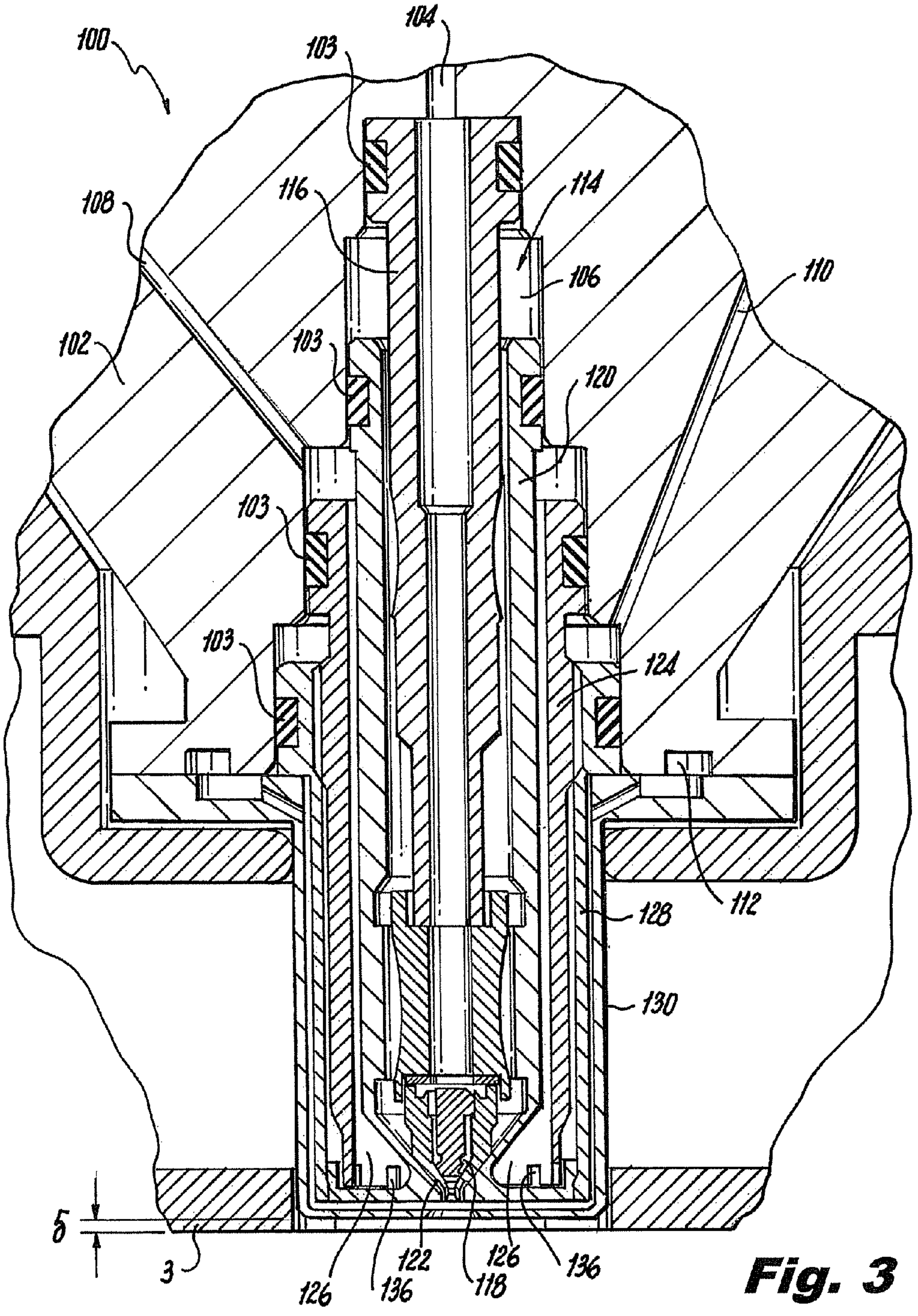
FIG. 3 is a cross-sectional side elevation view of the nozzle of FIG. 1, showing the thermal isolation inlet housing and conduits leading to the nozzle tip.
Figure 4:
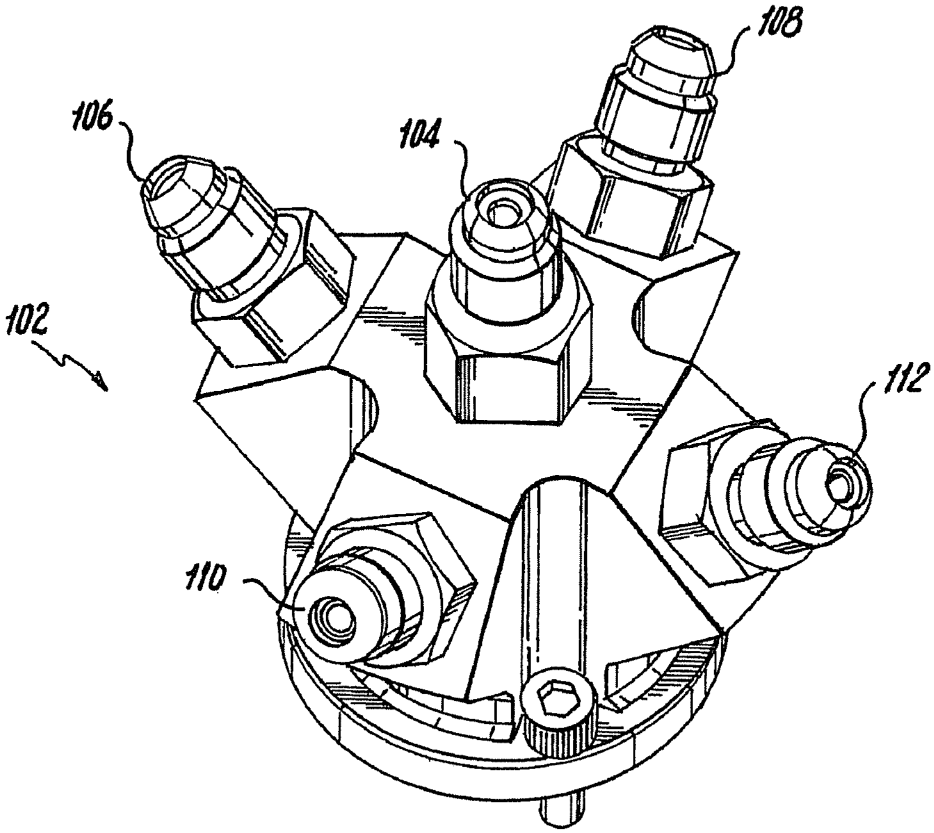
FIG. 4 is a perspective view of a portion of the nozzle of FIG. 3, showing the fuel and air inlets, and the coolant inlet and outlet of the inlet fitting.

Referring now to FIGS. 3-8, an exemplary pressure atomizing nozzle 100 in accordance with the present invention addresses these adverse heating effects. As shown in FIG. 3, an inlet housing 102 is provided for fluid connections to nozzle 100. Inlet housing 102 is thermally isolated from the main combustion housing 3 to which it is mounted in use. This prevents undesirable heat accumulation within its mass, as will be described in greater detail below. FIG. 4 shows the fluid inlets and coolant outlet of inlet housing 102. Inlet housing 102 includes a first fuel stage inlet 104, a second fuel stage inlet 106, a coolant fluid outlet 108, a coolant fluid inlet 110, and a cooling air inlet 112. Internal portions of these inlets 104, 106, 110, and 112 and outlet 108 are also shown in relation to their respective conduits in FIG. 3. Interior spaces are segregated from one another by elastomeric packings, such as o-rings 103. Two fuel stages are used so that during start up, only one stage provides fuel for combustion to avoid flooding, and then the second stage can be ignited for full power operation.

Inlet housing 102 defines an interior space 114, and is configured to thermally isolate interior space 114 from external conditions and to remain relatively cool under operation so as to substantially eliminate heat soak back from inlet housing 102 to interior space 114 after operation of nozzle 100. This thermal isolation is accomplished largely by cooling of inlet housing 102 by all fluids passing therethrough into nozzle 100, including coolant flow into and out of nozzle 100. As such, inlet housing 102 remains relatively cool during engine operation and therefore does not feed accumulated heat back into the fuel passages (i.e., heat soak back) when the engine is shut down or when the fuel flow is shut off while the high temperature gas flow remains on, e.g., exhaust gas flow. Thus nozzle 100 and its connections are isolated thermally from the hot adjacent housing to which nozzle 100 is mounted. In an exemplary application, inlet housing 102 stays relatively cool, never exceeding about 190° F., so it does not impose a heat soak back problem on fuel after shut down that would lead to coke or carbon deposition.

With continued reference to FIG. 3, a first fuel conduit 116 is mounted in interior space 114 of inlet housing 102 in fluid communication with first fuel stage inlet 104 for providing fuel to a first pressure atomizing nozzle 118 mounted thereto. A second fuel conduit 120 is mounted in interior space 114 outboard of first fuel conduit 116 and in fluid communication with second fuel stage inlet 106 for providing fuel to a second pressure atomizing nozzle 122 mounted outboard of first pressure atomizing nozzle 118.

A first coolant conduit 124 is mounted in interior space 114 outboard of second fuel conduit 120 and in fluid communication with coolant fluid outlet 108 and with nozzle tip region 126 for conducting coolant away from second pressure atomizing nozzle 122. A second coolant conduit 128 is mounted in interior space 114 outboard of first coolant conduit 124 in fluid communication with coolant fluid inlet 110 for conducting coolant to a nozzle tip region 126 proximate to the outlets of the first and second pressure atomizing nozzles 118, 122 to cool nozzle tip region 126.

Figure 5:
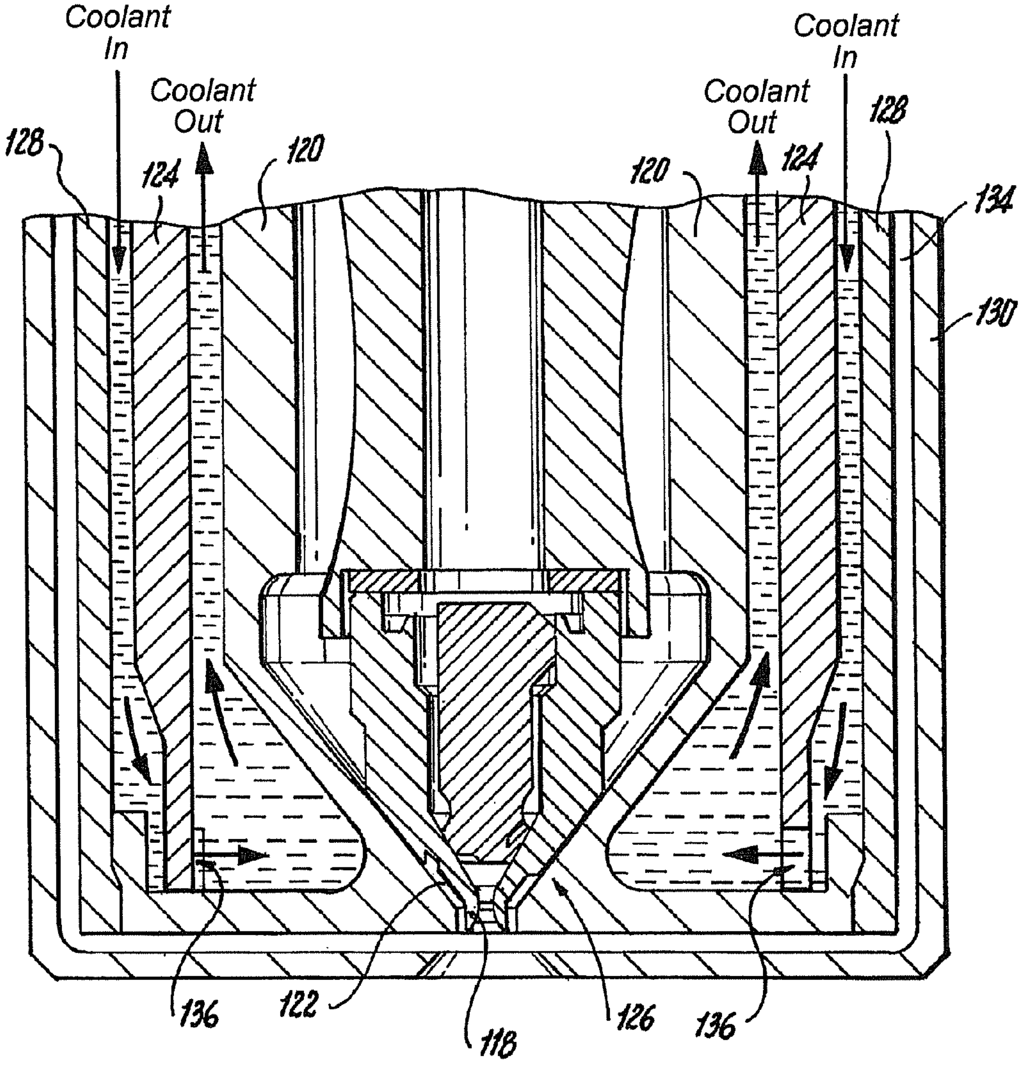
FIG. 5 is a cross-sectional side elevation view of a portion of the nozzle of FIG. 1, showing the flow of coolant to and from the nozzle tip.
Figure 6:
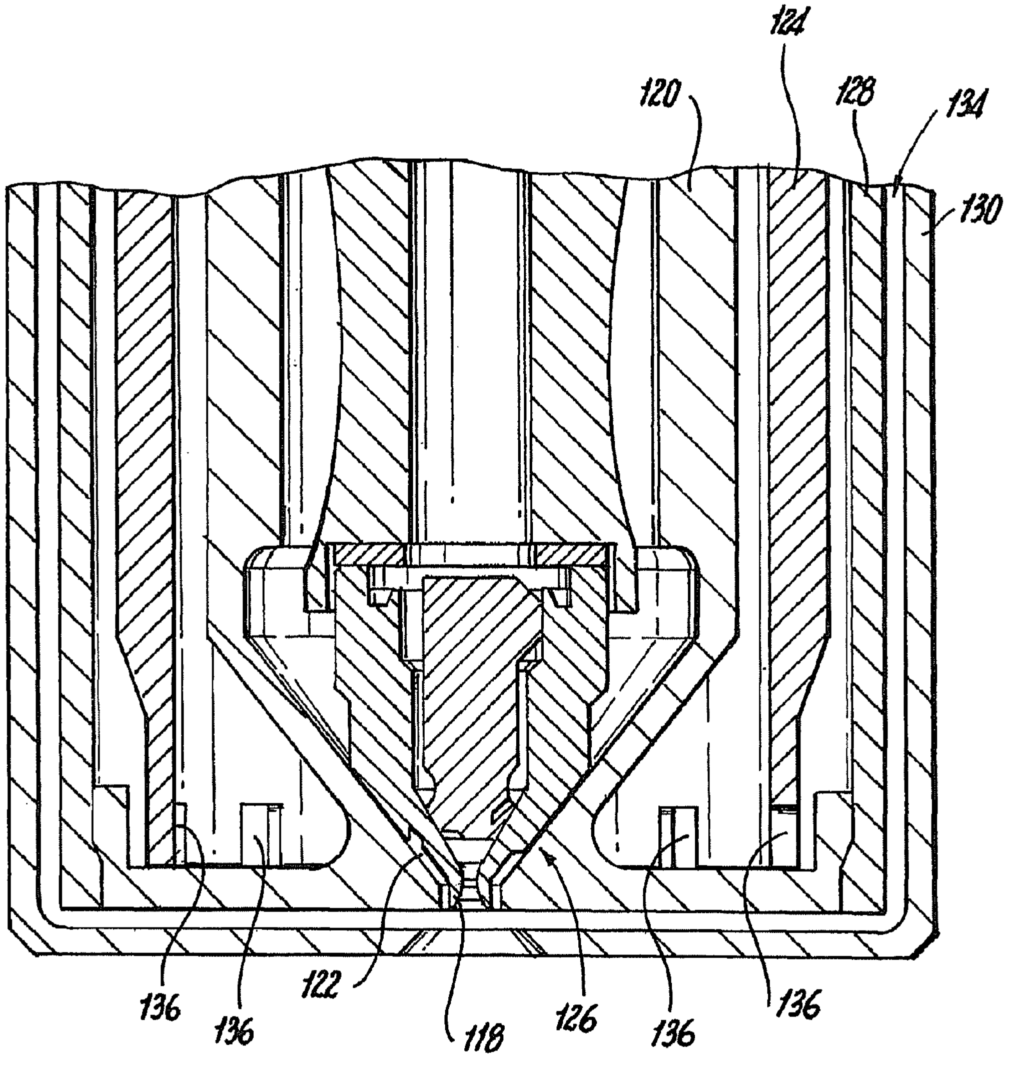
FIG. 6 is a cross-sectional side elevation view of a portion of the nozzle of FIG. 1, showing the castellation in the tip end of the first cooling conduit.

With reference now to FIG. 5, first and second coolant conduits 124 and 128 function to cool nozzle tip region 126 actively during operation and passively after operation. During operation, engine coolant is constantly circulated through nozzle 100 via conduits 124 and 128, reaching the extreme tip of the fuel distribution cone as indicated by the heavy coolant flow arrows shown in FIG. 5. Coolant flows in from coolant conduit 128 and through radial slots 136 in first coolant conduit 124, which are shown without coolant in FIG. 6, for egress via coolant fluid outlet 108, which is shown in FIGS. 3-4. Slots 136 are radially offset to induce swirl on coolant flowing therethrough to increase heat transfer, and are optionally dimensioned to serve as metering slots. Thus during engine operation, coolant is forced to impinge on the critical cone area of nozzle tip region 126 to maintain a cool environment even when fuel flow is shut off to nozzle 100. Once the engine is shut down, passive cooling results as heat reaching the coolant at the nozzle tip causes the coolant to circulate through buoyancy induced forces, thus encouraging cooler liquid to replace heated fluid. Engine coolant can be used as the coolant, or fuel or any other suitable coolant can be used if a cool supply is available.

Referring again to FIG. 3, a cooling air conduit or jacket 130 is mounted to inlet housing 102 outboard of second coolant conduit 128 in fluid communication with cooling air inlet 112 for conducting a flow of cooling air to an outlet end of second pressure atomizing nozzle 122. Cooling air jacket 130 is configured to be a heat shield and to thermally isolate inboard components from exterior conditions. Through jacket 130, clean air is provided during engine operation to nozzle tip region 126 for diluting carbon and thereby reducing carbon deposits on second pressure atomizing nozzle 122 and other components in nozzle tip region 126. The cooling air supplied through jacket 130 provides active cooling for nozzle tip region 126 during engine operation, and jacket 130 provides passive cooling to nozzle tip region 126 after engine operation by action of buoyancy forces. The downstream face of injector 100 is set in from the adjacent surface of housing 3 by small distance δ to account for thermal expansion and contraction, as well as tolerancing. In other words, when in a cool condition, nozzle 100 contracts from being flush with housing 3 by a distance δ, and when in a heated condition, nozzle 100 expands to be flush with housing 3. In FIG. 3, distance δ is exaggerated for clarity, but can be around 0.010 inches, for example, depending on the application. This is beneficial because protrusion of a nozzle out beyond the inner surface of the housing can sometimes increase heat transfer to the tip from the hot combustion gases in the combustor.

Figure 7:
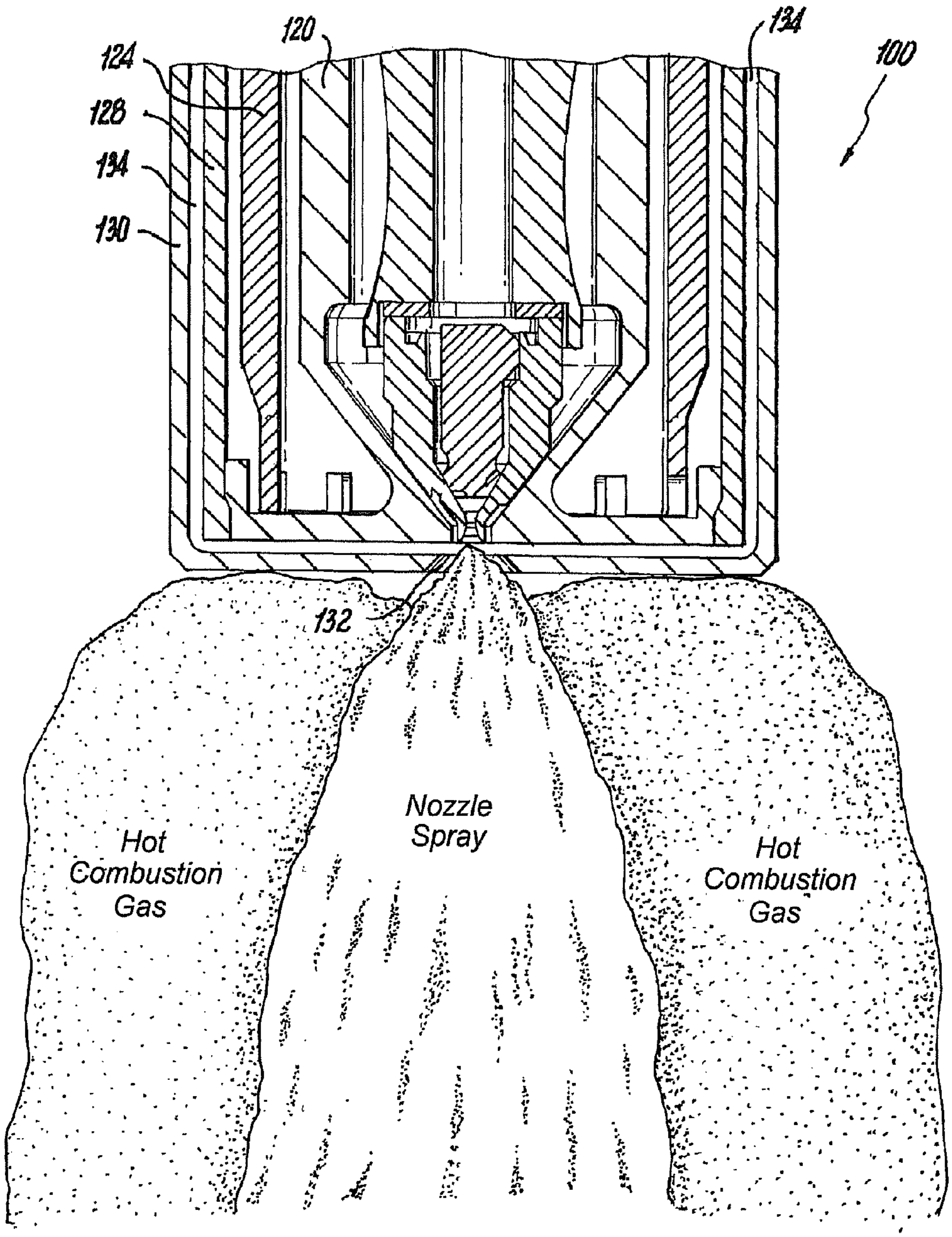
FIG. 7 is a cross-sectional side elevation view of a portion of the nozzle of FIG. 1, showing the nozzle spray and hot combustion gas during operation of the nozzle injecting fuel.

Referring now to FIG. 7, hot gas including combustion products, can heat the outer face of nozzle 100 when the nozzle 100 is operating, as indicated schematically by the flow regions in FIG. 7. In fact, the nozzle spray induces the hot gas to flow up to the actual fuel orifice 132. Jacket 130 acts as a heat shield against heat from this induced combustor flow. The cool air from air passage 134 of jacket 130 emanates around fuel orifice 132 thus diluting any carbonaceous gas flow and providing a cool buffer for the fuel nozzle surfaces. Air passage 134 is a cold air circuit that acts like an ejector to reduce or prevent recirculating combustion products from heating the nozzle face and from condensing around fuel orifice 132 in the form of carbon deposits. In an exemplary application, the metering hole for air passage 134 is about 0.1 inches in diameter.

Figure 8:
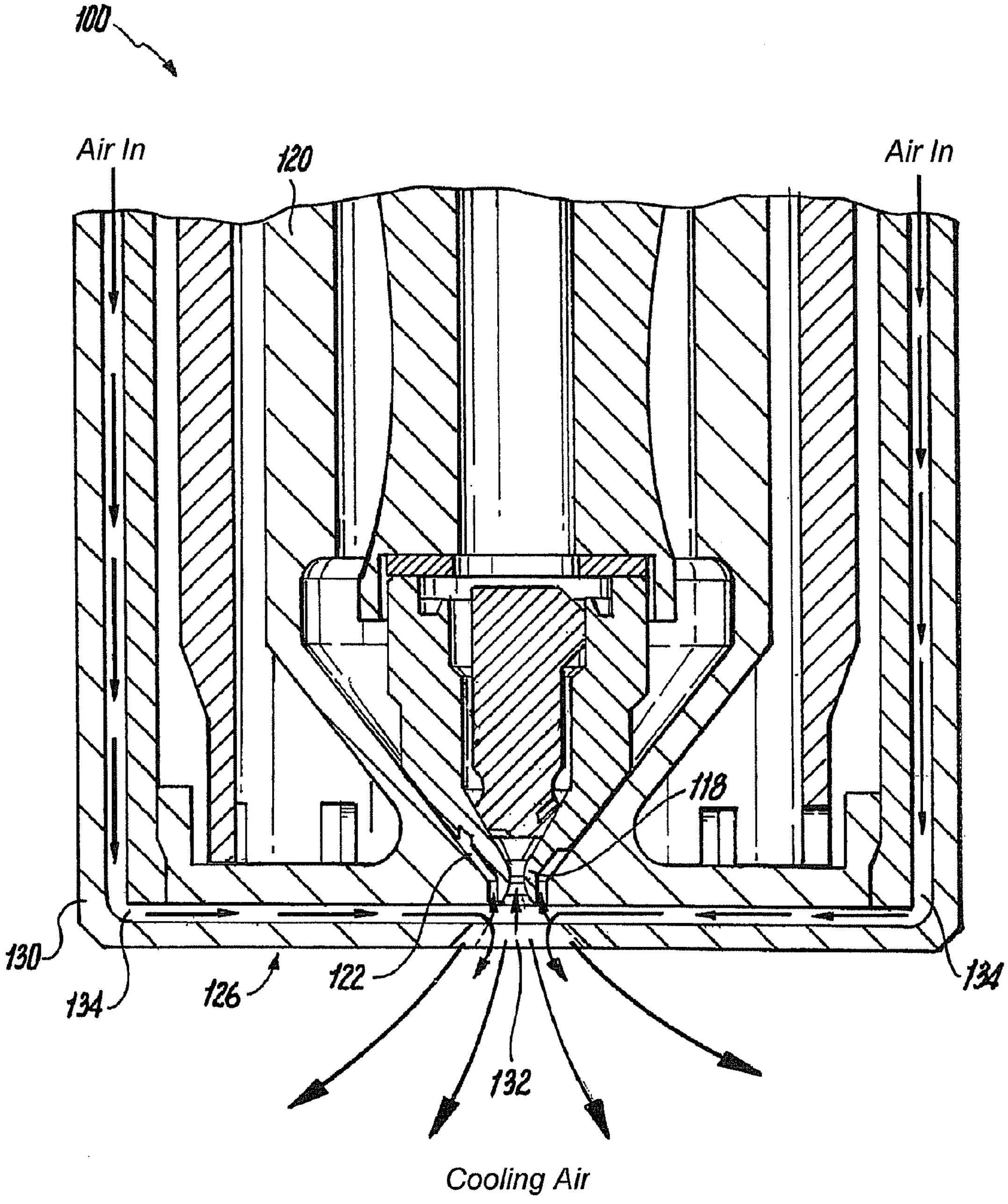
FIG. 8 is a cross-sectional side elevation view of a portion of the nozzle of FIG. 1, showing the flow of cooling air when the nozzle is not injecting fuel.

With reference now to FIG. 8, when the fuel flow is shut down in nozzle 100, the cool flow of air continues to provide a buffer against any reverse combustor flow. The residual pressure in the cold flow of air passage 134 ensures during fuel-off periods only cold, clean air enters the nozzle orifice, i.e. fuel orifice 132, as indicated by the arrows in FIG. 8. Thus, when fuel flow stops, cool, clean air will flow into nozzle 100 instead of hot exhaust or combustion products. As in the case of the coolant flow described above, when the engine is shut off and air passage 134 is no longer pressurized, cold air continues to circulate in jacket 130 replacing any heated air within the jacket by natural convection and buoyancy forces for passive cooling. This natural circulation together with heat shield effects of jacket 130 counteracts exhaust gas buoyancy effects occurring after engine operation to keep nozzle 100 cool even after complete engine shut down. Cooling air can be supplied through jacket 130 during and between nozzle operation, however, in applications where the cooling air has a detrimental affect on fuel spray or combustion during nozzle operation, the cooling air supply can be shut off while fuel is flowing to tip region 126.

Figure 9:
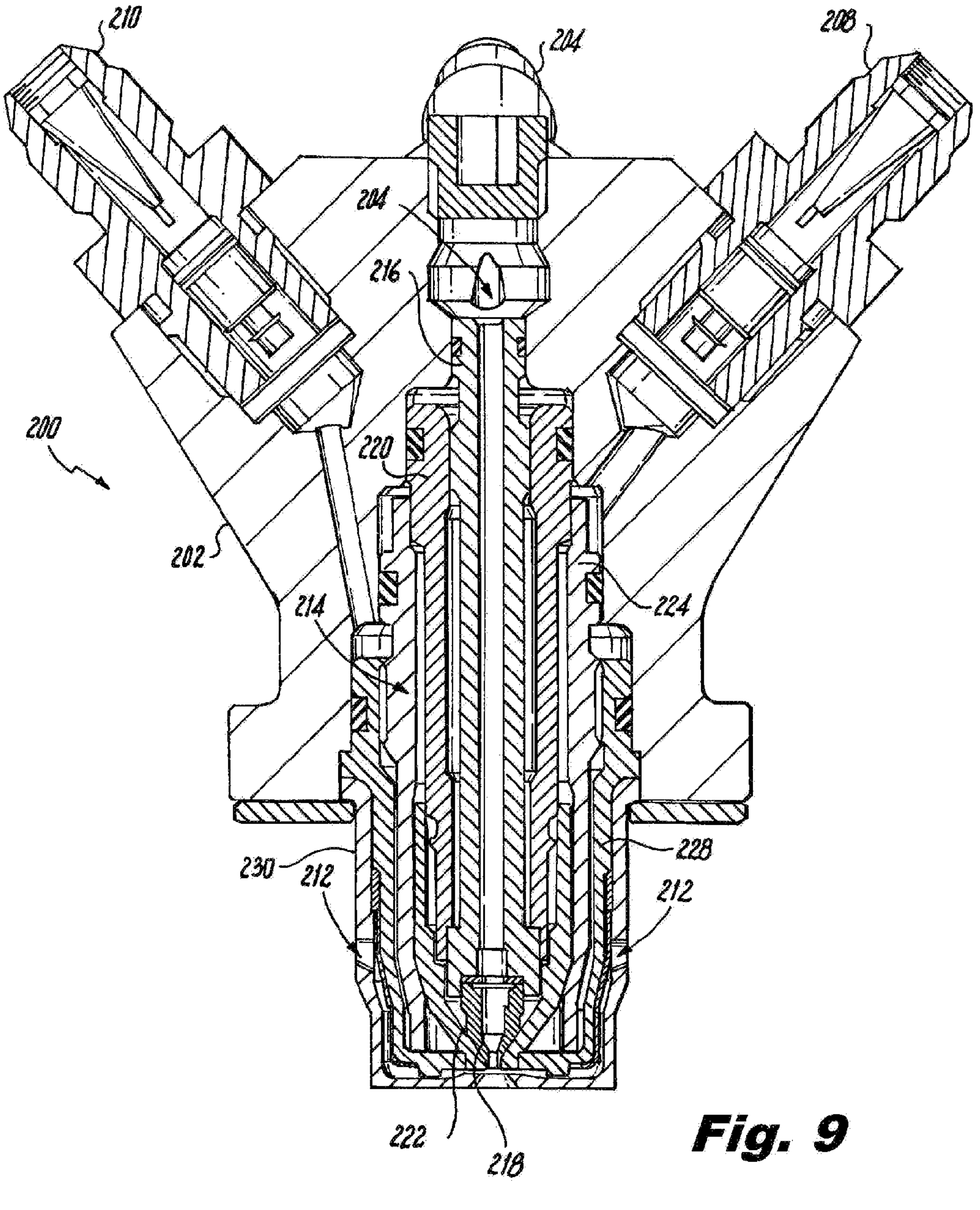
FIG. 9 is a cross-sectional side elevation view of another exemplary embodiment of a nozzle constructed in accordance with the present invention, showing the fuel and coolant conduits.

Referring now to FIGS. 9-13, another exemplary embodiment of a nozzle 200 in accordance with the present invention is described as follows. As shown in FIG. 9, Nozzle 200 includes an inlet housing 202 having an interior space 214, first and second fuel conduits 216 and 220, first and second pressure atomizing nozzles 218 and 222, first and second coolant conduits 224 and 228, and cooling air jacket 230 much as described above with respect to nozzle 100.

Figure 10:
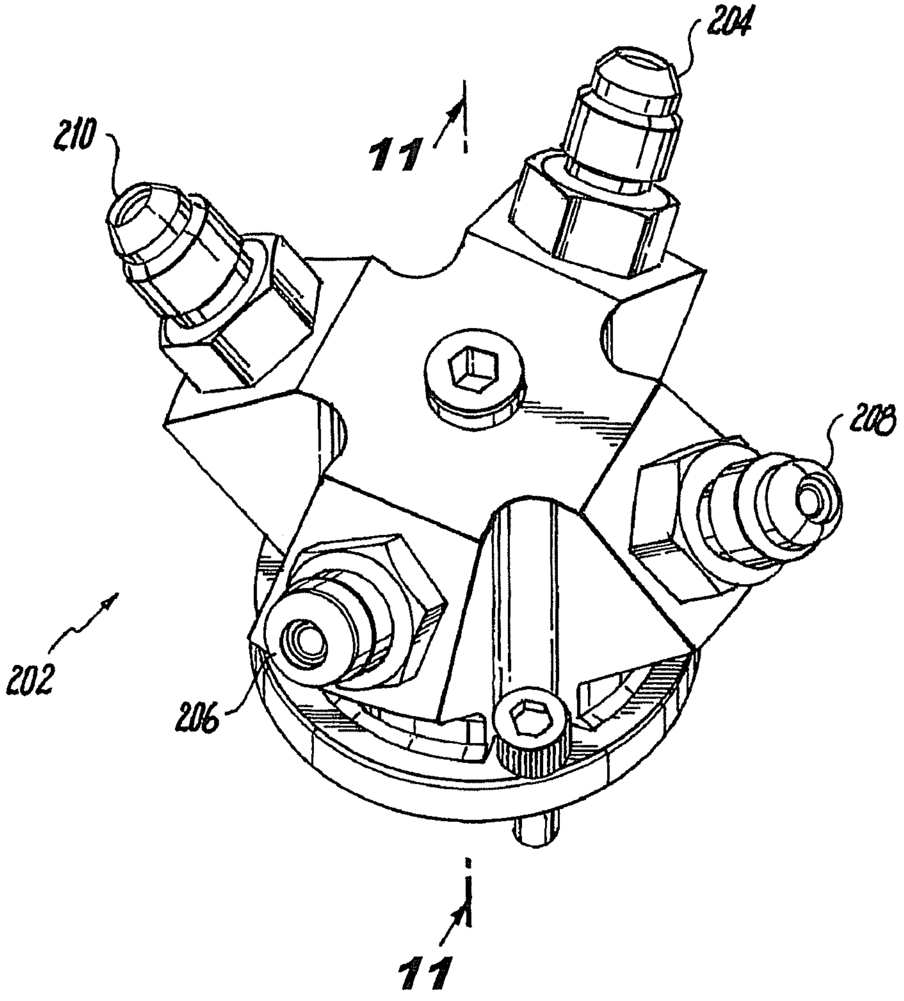
FIG. 10 is a perspective view of a portion of the nozzle of FIG. 9, showing the fuel inlets and the coolant inlet an outlet of the inlet fitting.

With reference now to FIG. 10, inlet housing 202 includes a first fuel stage inlet 204, a second fuel stage inlet 206, a coolant fluid outlet 208, and a coolant fluid inlet 210, much as described above with respect to inlet housing 102. Unlike inlet housing 102 described above, inlet housing 202 does not include an air inlet. Instead, as shown in FIG. 9, air inlets 212 are provided directly through air jacket 230 to provide pressurized air from an external source, e.g., filtered engine air, into air jacket 230. Nozzle 200 has a reduced length from inlets to nozzle tip compared to nozzle 100 described above, due the different arrangement of the various inlets and conduits, allowing for reduction of the overall size envelope required.

Figure 11:
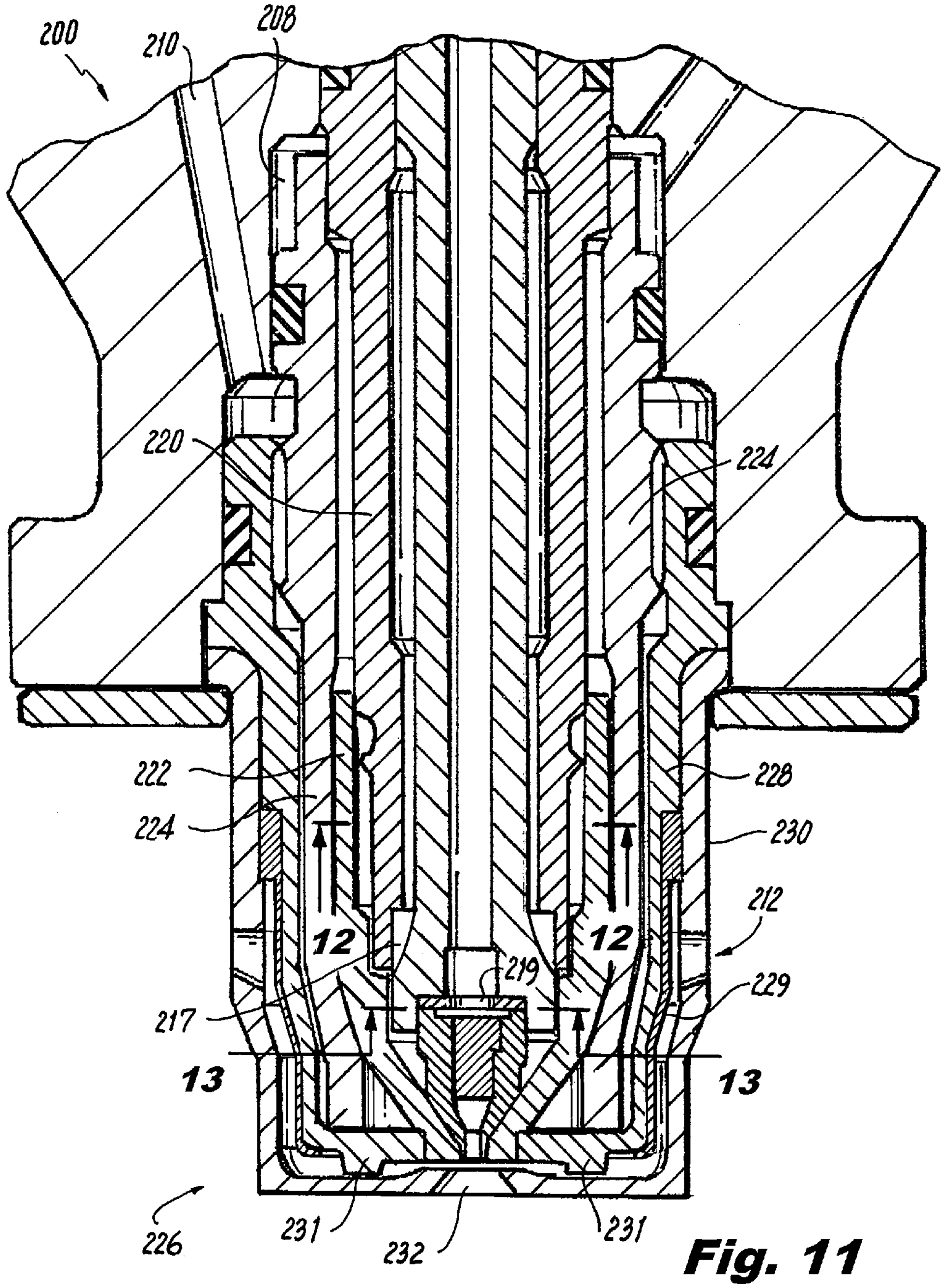
FIG. 11 is a cross-sectional side elevation view of a portion of the nozzle of FIG. 9, showing the tip region and air inlets through the cooling air jacket.

Referring to FIG. 11, nozzle 200 includes a heat shield 229 mounted between second cooling conduit 228 and air jacket 230. This provides thermal isolation to protect nozzle tip region 226 from heat in the air entering through air inlets 212. While air inlets 212 supply air to dilute the nozzle orifice and to provide cooling during combustion, the air supplied through air inlets 212 can be hot enough when the fuel flow is off to heat nozzle tip region 226. Heat shield 229 reduces the impact of this heat input. Air flowing in through cooling air inlets 212 flows between heat shield 229 and air jacket 230 and around standoffs 231 before reaching orifice 232. Standoffs 231 are configured with radially offset passages therebetween to impart swirl onto a flow of air therethrough for increasing cooling effectiveness in tip region 226. First coolant conduit 224, second coolant conduit 228, and air jacket 230 all have an outlet section having a reduced, e.g., necked down, diameter to reduce the size of nozzle tip region 226 for improved heat exchange. Conduit 224 is pushed into conduit 228 with sufficient force to elastically stretch the hole in conduit 228 and to induce a reactive spring force or interference fit which is sufficient to seal the interface without requiring brazing or the like. The smaller the diameter of the interference, the easier it is to accomplish the elastic interference fit and the higher the success of leak proofing becomes. In short, the reduced, necked down diameter in nozzle tip region 226 is advantageous for manufacturing. Second pressure atomizing nozzle 222 is mounted over the tip portion of second fuel conduit 220 to provide an atomized spray of fuel from between first and second pressure atomizing nozzles 218 and 222. Those skilled in the art will readily appreciate that while described herein in the exemplary context of dual orifices, it is also possible to achieve similar benefits to those described herein using single orifice pressure atomizers without departing from the spirit and scope of the invention.

Figure 12:
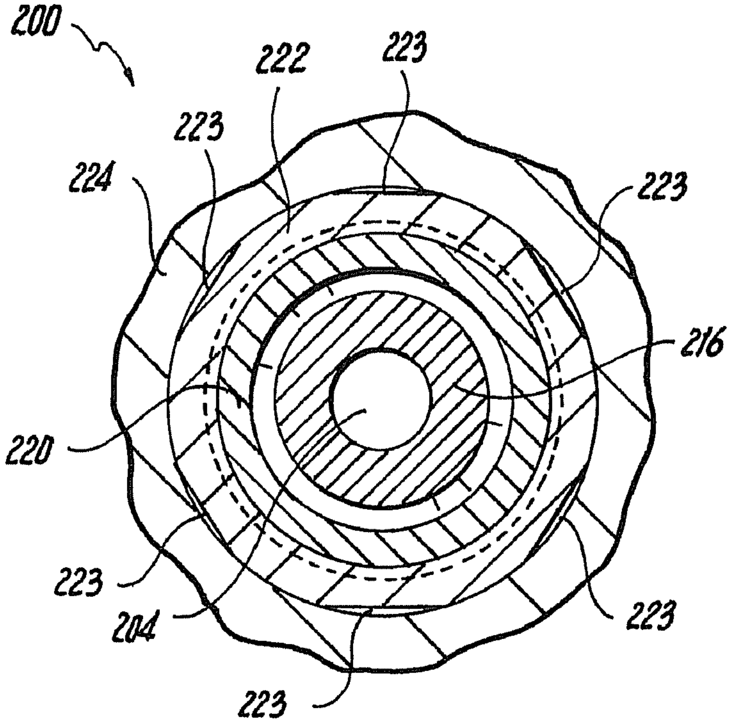
FIG. 12 is a cross-sectional end view of the nozzle of FIG. 9, showing the coolant return passages at the cross-section indicated in FIG. 11.

Referring now to FIG. 12, in order to allow coolant to egress from tip region 226 to coolant outlet 208, facets are formed in the outer surface of second pressure atomizing nozzle 222 to form coolant passages 223 between second pressure atomizing nozzle 222 and first coolant conduit 224. The cross-section in FIG. 12 is indicated in FIG. 11. Second pressure atomizing nozzle 222 is brazed to second fuel conduit 220, and the braze joint is not shown in FIG. 11, but is indicated by the dashed lines in FIG. 12. The space between conduits 216 and 220 is the secondary fuel channel.

Figure 13:
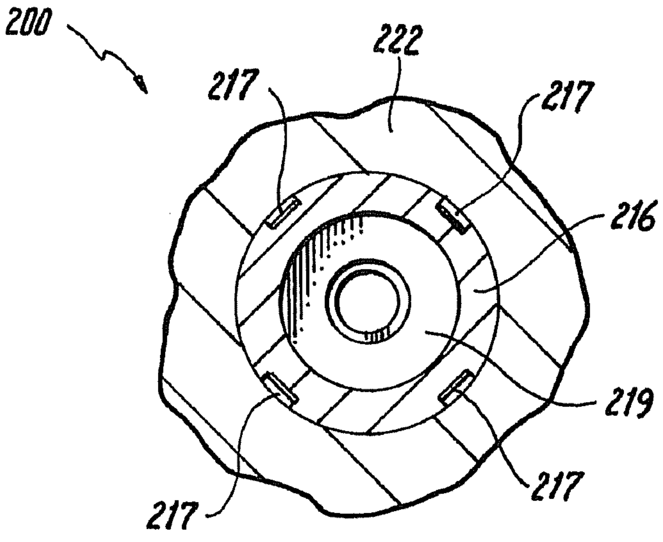
FIG. 13 is a cross-sectional end view of the nozzle of FIG. 9, showing the feed slots of the secondary fuel circuit at the cross-section indicated in FIG. 11.

Referring now to FIG. 13, secondary fuel flow from second fuel stage inlet 206 passes between first fuel conduit 216 and second pressure atomizing nozzle 222 through passages 217 defined in the outer surface of first fuel conduit 216. This allows second stage fuel to pass between second pressure atomizing nozzle 222 and first fuel conduit 216 on its way to be issued as a spray from the annular orifice between first and second pressure atomizing nozzles 218 and 222. Disc 219 separates the first and second fuel circuits from mixing together.

The devices and methods described above can be used to thoroughly cool fuel passages of nozzles both actively and passively to reduce or prevent coke accumulation, and to reduce or prevent carbon contamination on nozzle surfaces. While described above in the exemplary context of a duplex pressure atomizing nozzle used in exhaust treatment for a hydrocarbon combustion powered engine, those skilled in the art will readily appreciate that the devices and methods of the subject invention can be used in any suitable application. Moreover, the devices and methods of the invention can be used in any suitable type of nozzle or injector without departing from the spirit and scope of the invention.

The methods and systems of the present invention, as described above and shown in the drawings, provide for nozzles with superior properties including shielding and thermal isolation of interior passages and exterior surfaces to reduce and prevent carbon and coke deposits. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A spray nozzle, comprising:

a) an inlet housing including a fuel inlet, wherein the inlet housing defines an interior space and is configured to thermally isolate the interior space from external conditions during operation and to reduce heat soak back from the inlet housing to the interior space thereof after operation;

b) a fuel conduit mounted in the interior space of the inlet housing in fluid communication with the fuel inlet for providing fuel to a spray nozzle mounted to the fuel, conduit; and c) a cooling air jacket mounted to the inlet housing outboard of the fuel conduit and spray nozzle for conducting a flow of cooling air to nozzle tip region proximate an outlet end of the spray nozzle wherein the cooling air jacket is configured to thermally isolate inboard components from exterior conditions, to provide clean air during operation to the nozzle tip region for diluting carbon to reduce carbon deposits on the spray nozzle and for cooling the same, and to conduct air for passive cooling of the nozzle tip region after operation, wherein the fuel conduit is a first fuel conduit, wherein the spray nozzle is a first spray nozzle, wherein the fuel inlet is a first fuel stage inlet, wherein the inlet housing includes a second fuel stage inlet, and further comprising a second fuel conduit mounted in the interior space of the inlet housing outboard of the first fuel conduit and in fluid communication with the second fuel stage inlet for providing fuel to a second spray nozzle mounted outboard of the first spray nozzle.

2. A spray nozzle as recited in claim 1, wherein the inlet housing includes a cooling air inlet in fluid communication with an air flow circuit within the cooling air jacket for supplying cooling air during operation.

3. A spray nozzle as recited in claim 1, wherein the cooling air jacket includes a cooling air inlet in fluid communication with an air flow circuit within the cooling air jacket for supplying cooling air during operation.

4. A spray nozzle as recited in claim 1, further comprising:

d) a coolant conduit mounted outboard of the fuel conduit for circulating coolant in the nozzle tip region for cooling the spray nozzle; and e) heat shield mounted inboard of the cooling air jacket and outboard of the coolant conduit to provide thermal isolation therebetween.

5. A. spray nozzle as recited in claim 1, wherein the cooling air jacket includes an outlet aperture in proximity with the spray nozzle for providing an outlet for the spray nozzle and cooling air.

* * * * *